Nov. 10, 1959 L. W. PARKER 2,912,490

TUNING INDICATOR AND MUTER FOR TELEVISION RECEIVERS

Filed Nov. 6, 1953 2 Sheets-Sheet 1

INVENTOR
LOUIS W. PARKER
BY Moore & Hall
ATTORNEYS

Nov. 10, 1959 L. W. PARKER 2,912,490

TUNING INDICATOR AND MUTER FOR TELEVISION RECEIVERS

Filed Nov. 6, 1953 2 Sheets-Sheet 2

INVENTOR
LOUIS W. PARKER

BY Moore & Hall

ATTORNEYS

United States Patent Office 2,912,490
Patented Nov. 10, 1959

2,912,490

TUNING INDICATOR AND MUTER FOR TELEVISION RECEIVERS

Louis W. Parker, Great Neck, N.Y.

Application November 6, 1953, Serial No. 390,565

16 Claims. (Cl. 178—5.8)

This invention relates to television receivers and more particularly to devices for reducing the sound intensity and the picture brilliance when the receiver is detuned. It is especially applicable to television receivers employing the so-called intercarrier sound system. So far as the broader claims are concerned the invention is applicable to television receivers in which the station selector is moved in jumps to a plurality of pre-tuned positions, although it has greatest utility in connection with continuously tuned television receivers.

With conventional continuously tuned television receivers, the tuner of necessity passes through all signals existing on the frequencies over which the tuner is moved. Most of these signals create bright patterns on the viewing screen, changing rapidly as the tuning proceeds. These varying patterns are annoying to the eyes of the viewers. In addition during the tuning process disturbing noises issue from the loudspeaker. Inasmuch as most U.H.F. television tuners are continuously adjustable, the difficulties mentioned in this paragraph constitute a serious problem heretofore unsolved.

Another difficulty inherent in modern U.H.F. television receivers is that an unusual amount of skill is necessary to effect perfect tuning. This is especially true when the circuit is designed to employ the intercarrier sound system.

With the advent of the intercarrier sound system in television sets, it has no longer been possible to tune the set by adjusting the tuner until the sounds emitted by the loudspeaker have greatest amplitude or clearest tone, since the sound system operates as long as the tuning is within a wide range of adjustment. This is particularly objectionable in continuously tuned U.H.F. television receivers. The present invention solves the problem and allows the receiver to be tuned by the simple process of adjusting the tuner until the audio output is a maximum.

One object of this invention is to overcome the disadvantages and objectionable features hereinabove mentioned.

The primary object of this invention is to provide a tuning indicator whereby the cathode ray tube is blacked out whenever television signals are not being received.

Another object of the invention is to provide a tuning indicator for television receivers whereby the sound is silenced and the screen is blacked out whenever television signals are not being received.

Other objects of the invention will appear as this description proceeds.

In carrying out the invention I extract three signals from the intermediate frequency amplifier of the television receiver. First I extract the video modulation and apply it to the picture tube. Secondly, I extract the sound according to the principles that I taught the art in my U.S. Patent 2,448,908. Thirdly, I extract the intermediate frequency picture carrier and feed it to a sharply peaked tuned circuit. When the receiver is correctly tuned the sharply peaked tuned circuit is excited by the energy of the picture intermediate frequency carrier. The potential built up across this tuned circuit controls the bias on the audio amplifier tube in such a way that when the potential is low said audio amplifier is biased to cut-off and when the potential is high the said audio amplifier is biased for optimum amplification. The anode potential of the resistance coupled audio amplifier stage, therefore, is varied widely by the potential across the said tuned circuit. The variation in the anode potential of the audio amplifier is employed to control the brilliance of the picture tube to reduce (or cut off entirely) the brilliance when the audio amplifier is cut off and to increase the brilliance when the audio amplifier is in normal operation. Further information in regard to the system will be hereinafter set forth.

This application is related to my prior copending applications as follows: Serial No. 161,279, filed May 11, 1950, entitled Tuning System for Radio and Television Systems, now U.S. Patent No. 2,773,119, issued December 4, 1956; Serial No. 307,222, filed August 30, 1952, entitled: Tuning System for Television Receivers; Serial No. 312,981, filed October 3, 1952, entitled Improvement in Intercarrier Television Receivers, now U.S. Patent No. 2,826,633, issued March 11, 1958; and Serial No. 321,582, filed November 20, 1952, entitled Intercarrier Television Receiver.

Figure 1:
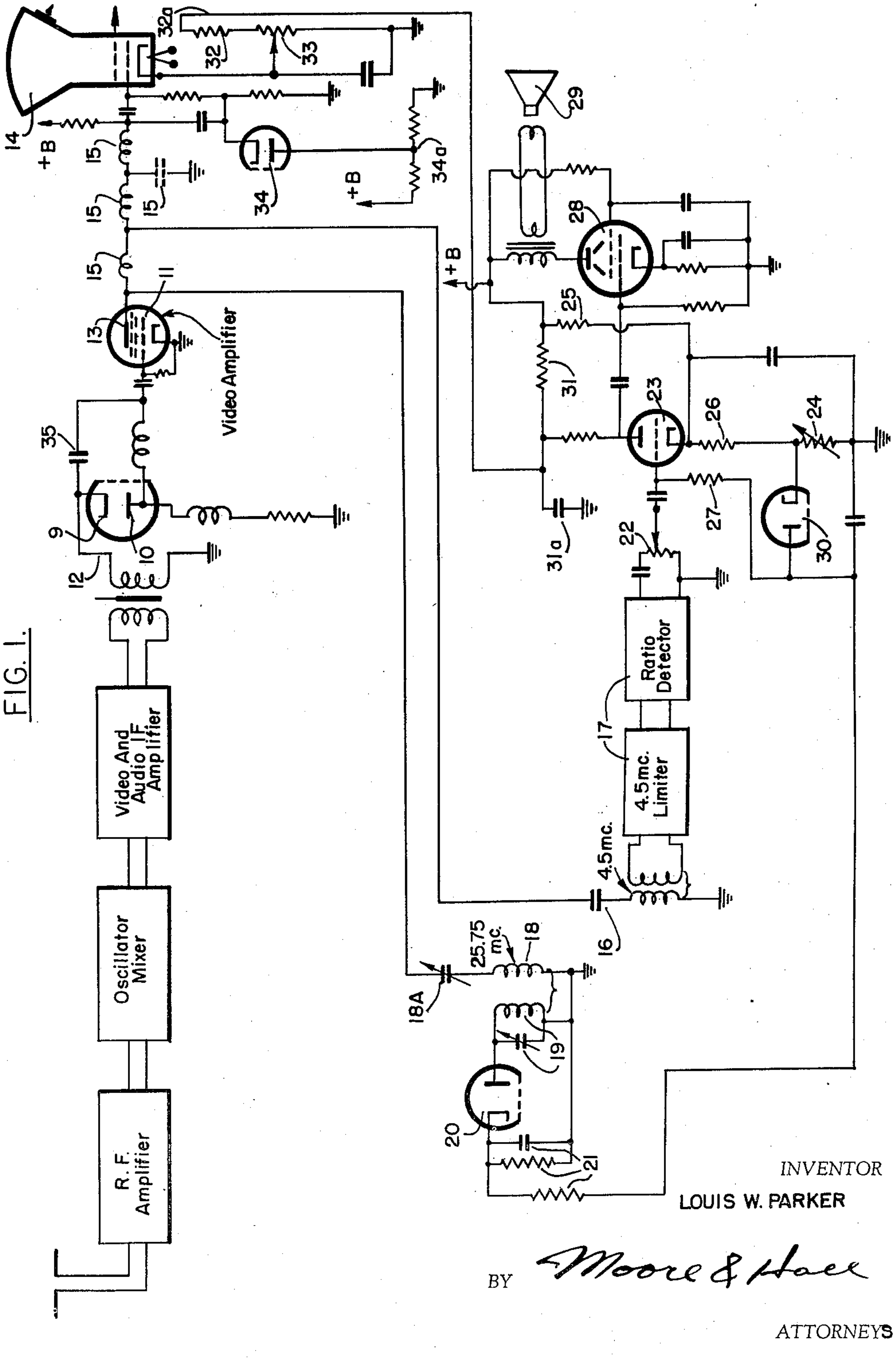
Figure 1 is a schematic diagram of the invention.

The device constituting the present invention is similar in every respect to the intercarrier Television Receivers shown and described in my prior U.S. Patent 2,448,908 except as set forth in detail below. The drawing shows a television receiver of one of the general types disclosed in said prior Patent 2,448,908. Preferably the receiver is of the superheterodyne type. The receiver shown in the drawing has a radio frequency amplifier, a mixer, an oscillator, an intermediate frequency amplifier and a second detector 9 as shown. The tuning of the radio frequency amplifier and oscillator-mixer is continuously variable, although it may be accomplished in steps or by switching different pre-tuned elements into the circuit. The anode 10 of the second detector has mainly three signals on it as follows: An I.F. picture carrier at 25.75 megacycles, a 4.5 mc. FM sound signal, and a video signal of 30 cycles to about 4 megacycles. The 25.75 mc. picture carrier reaches the grid of the video frequency amplifier through low capacity condenser 35 connected between the high R.F. potential end 12 of the last I.F. transformer and the grid 11 of the video amplifier. In addition to condenser 35 some of the I.F. signal reaches the video amplifier grid 11 through the stray capacities of the circuit. The band pass filter 15 has characteristics which allow the video modulation to pass to the grid of the cathode ray tube 14 but the 4.5 megacycle and the 25.75 mc. I.F. carrier are rejected from that path. The condenser 16 is so related to the first inductor of filter 15 that the 4.5 megacycle sound signal passes to intercarrier sound system 17. This system has a selector for passing only the 4.5 megacycle frequency modulated sound signal and also has a limiter and discriminator for converting that signal into amplitude modulated signals, all as described in detail in my said prior Patent 2,448,908.

The third signal on anode 13 is the 25.75 megacycle I.F. carrier which is fed to circuit 18, 18A which is tuned to 25.75 megacycles. Primary 18 induces potential in its associated secondary winding which is a part of tuned circuit 19, the latter being sharply tuned to 25.75 megacycles. When the tuned circuits of the radio frequency amplifiers and the oscillator-mixer stage are correctly tuned to a television transmitter, the I.F. picture carrier reaches the proper value of 25.75 mc. and a potential is built up across tuned circuit 19 which is rectified in diode 20 and fed by circuit elements 21 to resistor 27 which connects to the grid of triode 23.

The output of intercarrier sound system 17 is controlled by potentiometer 22 and fed to the grid of audio amplifier tube 23. This tube is biased to cut off, or to a point near to cut off, since its cathode potential is raised above ground by the potential appearing across cathode resistors 24 and 26. These resistors derive their potential from the main power supply through resistor 25.

The output of triode 23 is further amplified by pentode 28 and fed to the loudspeaker 29.

The cathode ray tube 14 has a direct current restorer 34 in the usual way, and also has resistors 32 and 33 connected to its cathode as shown. Resistor 33 is connected as a potentiometer and serves as a brilliance control. Resistor 31 is in series with the anode of triode 23 and also in series with resistors 32 and 33, hence variations in the current through triode 23 will affect the potential across resistors 32 and 33. This will in turn affect the brilliance of the cathode ray tube.

The operation of the system is as follows. When the tuners of the radio frequency amplifiers and of the oscillator-mixer stage are adjusted to a frequency on which there is no signal, no potential will appear across tuned circuit 19, and the potential developed across resistors 24 and 26 will bias triode 23 to (or near to) cut off. Hence, the triode 23 will draw little, if any, current through resistor 31. As a result, maximum potential will appear across resistors 32 and 33 thereby reducing the brilliance of the cathode ray tube 14. In effect this maximum potential places a negative bias on the grid of cathode ray tube 14.

When the tuners of the radio frequency amplifier and of the oscillator-mixer are tuned to a television station, the I.F. carrier signal appears at the anode 13 and develops a high potential across tuned circuit 19. This potential is rectified by diode 20 and applied to the grid of triode 23 through resistor 27. This potential reduces the cut-off bias to a normal operating bias and therefore allows triode 23 to amplify the audio output in the usual way. Hence, current flows in the anode of triode 23 which of course creates a potential drop across resistor 31. The latter action reduces the potential applied across resistors 32 and 33 and therefore allows cathode ray tube 14 to operate with normal brilliance. Condenser 31*a* smooths out variations in the potential applied across resistors 32 and 33.

It is clear, therefore, that when the I.F. picture carrier signal of proper frequency is fed to circuit 19, the bias on triode 23 and that on cathode ray tube 14 is altered so that these devices become operative in the normal way to provide audio output and a picture respectively. When the tuners of the radio frequency amplifier and of the oscillator-mixer stage are detuned the devices 14 and 23 are either inoperative or partially so.

Inasmuch as the I.F. picture carrier may reach higher values than necessary or useful in the operations hereinabove described, there is a limiter diode 30 connected between the lower ends of resistors 26 and 27. Instead of diode 30, the grid of triode 23 may act as the plate of a diode and limit the rise of the direct current potential above that of the cathode. This is less expensive but it can only operate with tubes where the use of zero grid bias does not result in distortion. Furthermore it is clear that the limiting actions referred to in this paragraph are optional and may be omitted entirely.

This invention provides means for deadening both the sound and picture. Within the broader aspects of my invention the brilliance could be deadened alone. In the event that a brilliance control alone is desired the output of potentiometer 22 would be fed directly to the grid of pentode 28 instead of to the grid of triode 23. If sound muting alone is desired line 32*a* is connected to +B. Moreover, resistor 24 is variable in order that the degree of muting may be adjusted or completely eliminated as desired.

The ground return of D.C. restorer 34 is made to point 34*a*, which is slightly positive with respect to ground. This is done in order to enable the adjustment of brilliance control 33 to be considerably above ground and so to receive more voltage variation between tuned and off tuned positions.

One advantage of the invention is that the only parts required in addition to conventional circuit elements are simple inexpensive parts. Tubes 23 and 28 are of course already present in the television set and they serve in my circuit in addition to their regular function. The diodes 20 and 30 which have been added may be simple crystal rectifiers.

The device of Figure 1 serves very well as a tuning indicator and fairly well as a muter. The muting can be improved if the circuit of Figure 2 is employed.

In Figure 1, any signal if properly tuned in will open the sound channel and increase the brilliance of the cathode ray tube. However, there will be no sound unless there is a second signal spaced 4.5 megacycles from the first one. Even then the limiter 17 will eliminate everything but the frequency modulation.

Figure 2:
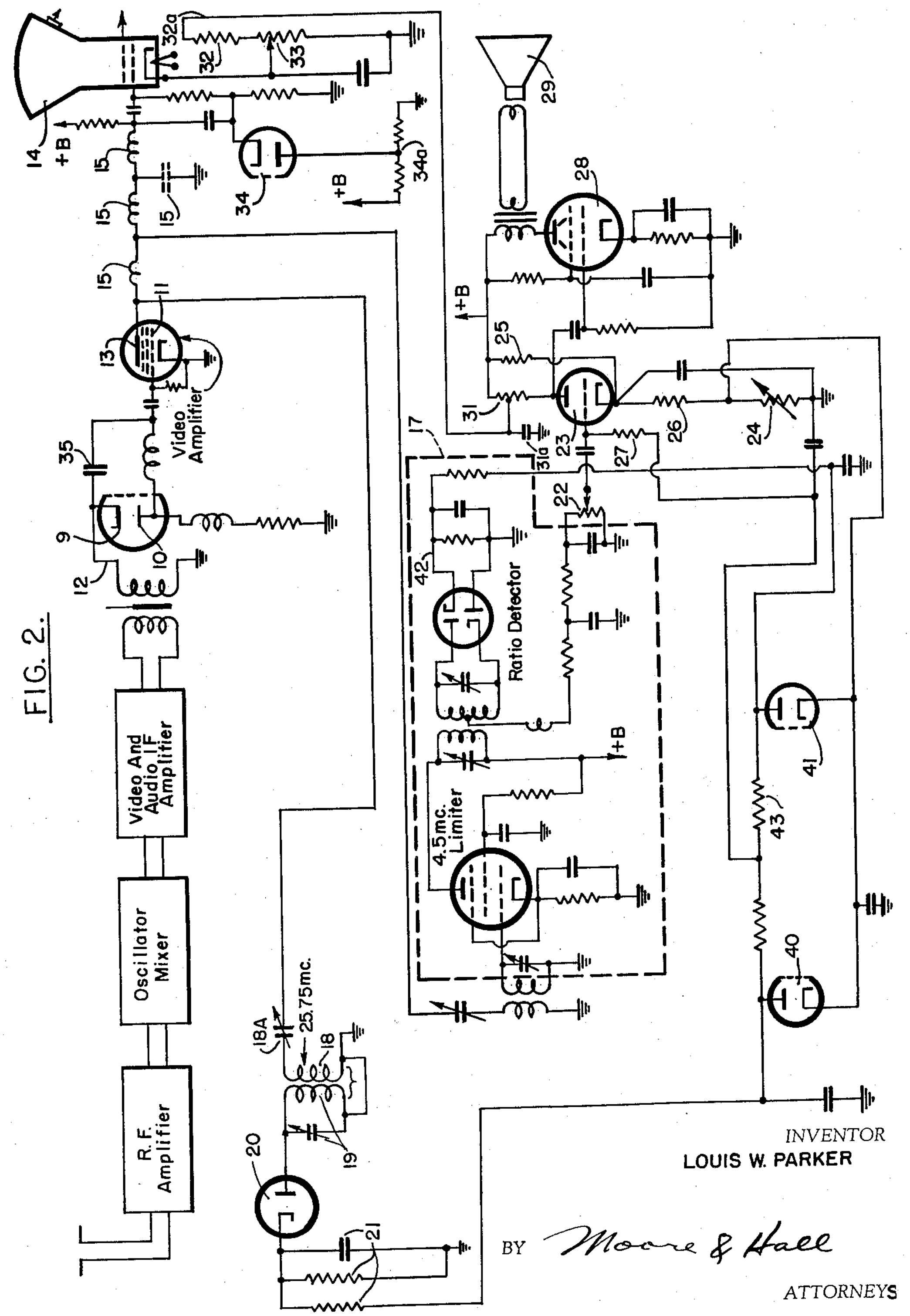
Figure 2 is a schematic diagram of a modified form of the invention.

In Figure 2 many of the parts are identical with complementary parts of Figure 1 and therefore bear like reference numbers. The main improvement in Figure 2 is that the bias of tube 23 does not rise materially above cut-off until there is a main signal on one frequency and a complementary frequency modulated signal spaced 4.5 megacycles therefrom. When a video signal and its complementary sound signal appears at the receiver, the demodulated sound signal appears across potentiometer 22 in addition to a potential that appears at the cathode wire 42 of the upper diode of the ratio detector. This potential is positive as compared to ground potential and is limited in amplitude by diode 41. The resulting potential is fed by way of resistors 43 and 27 to the grid of triode 23. Likewise the I.F. carrier frequency produces a positive potential at the anode of diode 40 (which is complementary to diode 34 of Figure 1). Diode 40 limits the potential due to the I.F. carrier to a predetermined maximum amplitude and the potential is applied to the grid of triode 23 through resistor 27. The potential applied to the grid of triode 23 due to the I.F. carrier is insufficient to cause this triode to conduct, and likewise the potential applied to the grid of triode 23 from the cathode wire 42 is likewise insufficient to render triode 23 conducting. However, when the potential due to the I.F. carrier is added to that due to the sound system 17, the resultant is sufficient to render triode 23 operative as an audio amplifier. The two potentials (one due to the I.F. carrier and the other 42 due to the sound) may control the amplifier 23 in any well known way. As for example there could be two grids, one for each potential. Likewise the potentials may be added together by applying them in parallel through resistors (as shown), or by adding the potentials by connecting them in series.

Once, the triode becomes conducting the sound signal appearing across potentiometer 22 is amplified in the usual way; and the cathode ray tube 14 is rendered operative according to the principles set forth in connection with Figure 1. Therefore, with the circuit of Figure 2, there is neither sound nor a picture unless two signals spaced 4.5 megacycles apart are received.

In the foregoing specification I have explained the principles of my invention and the best mode in which I have contemplated applying those principles, so as to distinguish my invention from other inventions; and I have particularly pointed out and distinctly claimed the part, improvement, or combination which I claim as my invention or discovery.

While I have shown and described certain preferred embodiments of my invention, it will be understood that modifications and changes may be made without departing from the spirit and scope thereof, as will be clear to those skilled in the art.

I claim to have invented:

1. A television receiver comprising a superheterodyne receiver including tuning means, means for producing an intermediate frequency picture carrier having video modulations and a frequency modulated sound carrier, a second detector fed by the output of the last-named means, and an amplifier in the output of the second detector, there being sufficient capacity between the input and output of the second detector that some potential at the intermediate frequency picture carrier appears in said amplifier; picture reproducing means; filter means connecting said amplifier to the picture producing means for passing the video signals and rejecting the sound as well as the intermediate frequency picture carrier signals; detecting and limiting means; filter means connecting the output of said amplifier to the detecting and limiting means to energize the latter with sound modulated signals only; resonant means tuned to the intermediate frequency picture carrier and connected to the output of said amplifier; sound reproducing means connected to the output of the detecting and limiting means; and deadening means for deadening one of said reproducing means and including means for inhibiting the deadening in response to development of potential across said resonant circuit.

2. A television receiver comprising input means having a tuner for tuning to a plurality of television stations and for producing an intermediate frequency picture carrier modulated with video signals and a carrier that is frequency modulated with sound signals, picture producing means, filter means connecting said input means with the picture producing means and allowing the video modulations to pass to the picture producing means while rejecting signals at other frequencies, a first resonant circuit coupled to said input means and tuned to the sound carrier frequency for extracting said sound signals, demodulating and limiting means fed by said first resonant circuit, sound reproducing means fed by said demodulating and limiting means, a second resonant circuit coupled to said input means and tuned to the frequency of and responsive to the intermediate frequency picture carrier, and means for deadening the picture producing means including means for inhibiting the deadening in response to development of potential across said second resonant circuit.

3. In a television receiver, a tunable superheterodyne receiver having a second detector stage, said receiver including means whereby video, sound and intermediate frequency picture carrier signals all appear in the output of said second detector stage, first means coupled to said second detector stage for extracting the video signals from said second detector stage and for isolating said video signals from the sound and intermediate frequency picture carrier signals, a picture tube controlled by said isolated video signals, a sound system, second means coupled to said second detector stage for extracting the sound signals from said second detector stage and for coupling said sound signals to said sound system, said sound system including means for demodulating said sound signals, third means coupled to said second detector stage for extracting the intermediate frequency picture carrier from the output of the second detector stage, said third means including a sharply peaked resonant device tuned to the frequency of the intermediate frequency picture carrier, and control means coupled to and responsive to said resonant device for controlling the background illumination of said picture tube.

4. A television receiver as defined in claim 3 in which said control means also includes means coupled to said sound system for controlling the output of said sound system simultaneous with said picture tube background illumination control.

5. The combination of claim 3 wherein said sound system includes an audio amplifier, said control means including means coupled to said resonant device for controlling the gain of said audio amplifier.

6. A television receiver comprising a superheterodyne receiver having means responsive to a received signal for producing an intermediate frequency picture carrier, and also having means responsive to said received signal for producing a video modulation signal, picture producing means, means coupling said video modulation signal to said picture producing means, a resonant circuit tuned to the frequency of said intermediate frequency picture carrier, means coupling said intermediate frequency picture carrier to said resonant circuit, and control means responsive to potentials developed in said resonant circuit for correctly tuning said receiver, said control means being operative to increase the effect of said video modulation signal on said picture producing means when said resonant circuit is excited by the intermediate picture frequency carrier thereby to give an indication of correct tuning on said picture producing means, and being operative to decrease the effect of the video modulation signal on said picture producing means when said resonant circuit is not excited by the intermediate frequency picture carrier thereby to give an indication of an incorrect tuning on said picture producing means.

7. A television receiver as defined in claim 6 having means responsive to said received signal for producing an audio signal, means responsive to said audio signal for producing audible sound therefrom, and means for reducing the volume of said sound when said resonant circuit is not excited by the intermediate frequency picture carrier and for increasing the volume of said sound when the resonant means is excited by the intermediate frequency picture carrier whereby the volume of said sound gives a further indication of correct and incorrect tuning of said receiver.

8. A television set comprising a superheterodyne receiver having input means responsive to a received composite signal for producing an intermediate frequency picture carrier, modulated with both video and sound signals, first frequency selective circuit means coupled to said input means for extracting video modulations from said carrier, picture producing means coupled to said first circuit means and responsive to said extracted video modulations for displaying a picture, a sound system including second frequency selective means coupled to said input means for extracting sound modulations from said carrier, said sound system including means responsive to said extracted sound modulations for emitting sound waves, resonant means tuned to said intermediate frequency picture carrier and responsive to the presence or absence of said intermediate frequency picture carrier for respectively increasing or decreasing the gain in said sound system, and control means coupled to both said resonant means and said picture producing means for reducing the picture brilliance of said picture producing means when said resonant means reduces the gain in said sound system.

9. A television set as defined by claim 8 in which the sound system includes an audio amplifier stage the gain of which is controlled by the resonant means, said amplifier stage including an electron discharge device having an anode, said control means being responsive to the average current drawn by said anode and including means operative to reduce the picture brilliance when said anode current is reduced and operative to increase the picture brilliance when said anode current is increased.

10. In a television receiver, input means for intercepting and demodulating video and sound modulated signals having a predetermined spacing, said input means including means for producing an intermediate frequency carrier for both the video and sound modulations, means coupled to said input means and responsive to said video modulations for displaying a picture, means coupled to said input means and responsive to said sound modulations for producing sound, said receiver including a second detector and a video frequency amplifier, a bridging condenser across the second detector connected to permit at least a portion of the intermediate picture frequency carrier to reach the video frequency amplifier, resonant means coupled to an output of said video frequency amplifier, said resonant means being sharply tuned to said picture intermediate frequency carrier to produce a first control potential when said picture intermediate frequency carrier is present, said receiver including means for developing a second control potential when a sound modulated signal is present on said carrier, and means for muting the effects of at least one of said video and sound modulation signals in the absence of the coexistence of both of said first and second control potentials.

11. A television receiver as defined in claim 10 wherein at least one of said control potential producing means includes a limiter for limiting the value of one of said control potentials so that it alone is insufficient to prevent the muting of at least one of said modulation signals.

12. A television receiver as defined in claim 10 wherein said first and second control potential producing means respectively include limiters, said limiters being operative to limit said first and second control potentials respectively whereby both potentials must coexist to prevent muting of at least one of said modulation signals.

13. A television set comprising a superheterodyne receiver having input means responsive to a received signal for producing an intermediate frequency picture carrier signal, a video modulation signal and a sound modulation signal, a video amplifier, means coupling said video modulation and sound modulation signals to said video amplifier, picture producing means including means coupled to said video amplifier for extracting amplified video modulations from the output of said video amplifier and for displaying a picture, a sound system including means coupled to said video amplifier for extracting sound modulations from the output of said video amplifier, said sound system including gain control means, means coupling at least a portion of said intermediate frequency picture carrier to said video amplifier thereby to amplify said carrier in said video amplifier, means coupled to said video amplifier for extracting said amplified intermediate frequency picture carrier from the output of said video amplifier, said last-named means including resonant means coupled to the output of said video amplifier and responsive to the presence or absence of said intermediate frequency picture carrier for selectively producing a first control signal, said sound system including means responsive to the presence or absence of said sound modulations for selectively producing a second control signal, and means coupling both said first and second control signals to said gain control means, said gain control means being operative normally to inhibit an output from said sound system in the absence of coexistence of both said first and second control signals.

14. A television receiver having input means for producing an intermediate frequency picture carrier and a frequency modulated sound carrier, means coupled to said input means for extracting and isolating video modulation signals from said picture carrier, means coupled to said last named means and responsive to the isolated video modulation signals for producing a picture, a video amplifier, means coupling at least a portion of said intermediate frequency picture carrier to said video amplifier, a first resonant circuit coupled to the output of said video amplifier and tuned to the frequency of said intermediate frequency picture carrier, a second resonant circuit coupled to the output of said video amplifier and tuned to the frequency of said sound carrier, sound producing means coupled to said second resonant circuit and responsive to sound signals developed in the second resonant circuit for producing sound, and means for muting the effects of at least one of said video and sound signals in the absence of a signal developed in said first resonant circuit by said intermediate frequency picture carrier.

15. A television receiver comprising superheterodyne means for producing an intermediate frequency picture carrier and for also producing demodulated video and frequency modulated sound signals, said receiver including tuning means operative to vary the frequency of said intermediate frequency picture carrier, filter means connected to said superheterodyne means for allowing said video signals to pass and for rejecting said intermediate frequency picture carrier and sound signals, picture producing means fed by the output of said filter means, first resonant means connected to said superheterodyne means to reject said intermediate frequency picture carrier and video signals and to pass said sound signals, limiting and detecting means coupled to said first resonant means and responsive to sound signals passed by said first resonant means, an audio amplifier in the output of said limiting and detecting means, means for normally biasing said audio amplifier substantially to cut-off, said receiver including a video amplifier, means coupling at least a portion of said intermediate frequency picture carrier to said video amplifier, second resonant means connected to the output of said video amplifier and sharply tuned to a preselected intermediate frequency picture carrier frequency for producing a control signal in response to occurrence of said preselected intermediate frequency picture carrier frequency during tuning of said receiver, and means coupling said control signal to said audio amplifier to overcome said biasing means.

16. A television receiver as defined in claim 15 including means controlled by the output of said audio amplifier for biasing the picture producing means to cut off when said audio amplifier is cut off and for allowing the picture producing means to create a picture when said audio amplifier is not cut off.

References Cited in the file of this patent

UNITED STATES PATENTS

| | | |
|---|---|---|
| Re. 21,826 | Case | June 17, 1941 |
| 2,056,607 | Holmes | Oct. 6, 1936 |
| 2,137,123 | Lewis et al. | Nov. 15, 1938 |
| 2,168,874 | Lewis | Aug. 8, 1939 |
| 2,173,173 | Lewis | Sept. 19, 1939 |
| 2,504,662 | Dome | Apr. 18, 1950 |
| 2,543,523 | Couillard | Feb. 27, 1951 |
| 2,602,855 | Cunningham | July 8, 1952 |
| 2,632,047 | Schlesinger | Mar. 17, 1953 |
| 2,632,800 | Schlesinger | Mar. 24, 1953 |
| 2,653,995 | Boyle | Sept. 29, 1953 |
| 2,773,119 | Parker | Dec. 4, 1956 |

OTHER REFERENCES

"Modern Television Receivers," Radio and Television News, May 1949, pages 64–66 and 100–104.